(12) United States Patent
Otake (10) Patent No.: US 11,460,067 B2
(45) Date of Patent: Oct. 4, 2022

(54) WASHER AND WASHER MANUFACTURING METHOD

(71) Applicant: Taiho Kogyo Co., Ltd., Toyota (JP)

(72) Inventor: Toshiyuki Otake, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 791 days.

(21) Appl. No.: 16/463,018

(22) PCT Filed: Aug. 29, 2017

(86) PCT No.: PCT/JP2017/030959
§ 371 (c)(1),
(2) Date: May 22, 2019

(87) PCT Pub. No.: WO2018/123138
PCT Pub. Date: Jul. 5, 2018

(65) Prior Publication Data
US 2020/0063786 A1 Feb. 27, 2020

(30) Foreign Application Priority Data

Dec. 27, 2016 (JP) .............................. JP2016-252844

(51) Int. Cl.
*F16B 43/00* (2006.01)
*B21D 53/20* (2006.01)
*F16B 39/24* (2006.01)

(52) U.S. Cl.
CPC .............. *F16B 43/00* (2013.01); *B21D 53/20* (2013.01); *F16B 39/24* (2013.01)

(58) Field of Classification Search
CPC .......... F16B 37/04; F16B 39/10; F16B 39/24; F16B 41/002; F16B 43/00; F16B 43/006; B21D 53/20

(Continued)

(56) References Cited

U.S. PATENT DOCUMENTS 1,332,626 A * 3/1920 Henegar ................ F16B 43/007
24/1
1,558,364 A * 10/1925 Iverson ................... F16B 21/16
301/38.1

(Continued)

FOREIGN PATENT DOCUMENTS

CN 101802429 A 8/2010
DE 4123231 A1 1/1993

(Continued)

OTHER PUBLICATIONS

First Office Action dated Jan. 28, 2015, by the Chinese Patent Office in corresponding Chinese Patent Application No. 201780078968.8, and an English Translation of the Office Action. (14 pages).

(Continued)

*Primary Examiner* — Roberta S Delisle
(74) *Attorney, Agent, or Firm* — Buchanan Ingersoll & Rooney PC (57) ABSTRACT

A washer includes a first washer piece formed in a circular arc shape and formed with a first fitting portion that protrudes from one end in a circular arc direction; and a fourth washer piece formed with a second fitting portion that is recessed from one end in the circular arc direction and fitted with the first fitting portion. The first fitting portion and the second fitting portion are fitted in a state where approach and separation therebetween in the circular arc direction is controlled. One of the first fitting portion and the second fitting portion includes a crimped portion that is formed in a state where a side surface of the one of the fitting portions is pushed into a side surface of the other of the fitting portions, the one of the fitting portions being fixed to the other of the fitting portions by the crimped portion.

5 Claims, 12 Drawing Sheets (58) Field of Classification Search
USPC .......................... 470/41; 411/531, 540, 541
See application file for complete search history.

(56) References Cited

U.S. PATENT DOCUMENTS

| | | | | |
|---|---|---|---|---|
| 2,144,831 | A * | 1/1939 | Burns | F16D 69/022 |
| | | | | 192/107 R |
| 4,449,621 | A * | 5/1984 | F'Geppert | F16D 13/648 |
| | | | | 192/70.14 |
| 5,713,450 | A | 2/1998 | Quigley | |
| 5,779,418 | A * | 7/1998 | Ying-Che | F16B 37/0892 |
| | | | | 411/433 |
| 5,833,776 | A * | 11/1998 | Labesky | F16B 43/00 |
| | | | | 403/294 |
| 5,836,367 | A * | 11/1998 | Calabrese | F16L 3/1215 |
| | | | | 138/112 |
| 7,011,482 | B2 * | 3/2006 | Underwood | F16B 43/006 |
| | | | | 411/539 |
| 7,798,301 | B2 * | 9/2010 | Keating | F16D 13/648 |
| | | | | 192/70.14 |
| 9,951,826 | B2 * | 4/2018 | Vogele | F16D 13/648 |
| 2002/0043441 | A1 | 4/2002 | Fujita | |
| 2004/0079595 | A1 | 4/2004 | Fabricius et al. | |
| 2004/0208729 | A1 * | 10/2004 | Underwood | F16B 43/006 |
| | | | | 411/540 |
| 2006/0144668 | A1 * | 7/2006 | Voegele | F16D 13/648 |
| | | | | 29/469 |
| 2006/0182518 | A1 * | 8/2006 | Underwood | F16B 43/007 |
| | | | | 411/539 |
| 2008/0314713 | A1 | 12/2008 | Vogele et al. | |
| 2010/0193317 | A1 | 8/2010 | Neubauer et al. | |
| 2017/0276156 | A1 | 9/2017 | Widrig et al. | |

FOREIGN PATENT DOCUMENTS

| | | |
|---|---|---|
| DE | 10 2014 007 270 A1 | 11/2015 |
| JP | H10110740 A | 4/1998 |
| JP | H11325108 A | 11/1999 |
| JP | 2004144301 A | 5/2004 |
| JP | 2005344745 A | 12/2005 |
| JP | 2009513917 A | 4/2009 |
| JP | 2016109211 A | 6/2016 |
| WO | 2007143987 A1 | 12/2007 |
| WO | 2015179111 A1 | 11/2015 |
| WO | 2016045801 A1 | 3/2016 |

OTHER PUBLICATIONS

First Office Action dated Feb. 21, 2020, by the Chinese Patent Office in corresponding Chinese Patent Application No. 201780078968.8, and an English Translation of the Office Action. (14 pages) [The description in the Information Disclosure Statement filed on Apr. 22, 2020 included an incorrect issue date ].

International Search Report (PCT/ISA/210) dated Nov. 21, 2017, by the Japanese Patent Office as the International Searching Authority for International Application No. PCT/JP2017/030959.

Written Opinion (PCT/ISA/237) dated Nov. 21, 2017, by the Japanese Patent Office as the International Searching Authority for International Application No. PCT/JP2017/030959.

* cited by examiner

WASHER AND WASHER MANUFACTURING METHOD

TECHNICAL FIELD

The present invention relates to techniques of a washer and a washer manufacturing method.

BACKGROUND ART

Conventionally, there have been known techniques of a washer and a washer manufacturing method. As the washer, for example, the one formed in an annular shape is known. That is as described in Patent Literature 1, for example.

A washer with such a shape can be manufactured by punching (performing press working on) a plate-shaped material with a predetermined mold.

Figure 12:
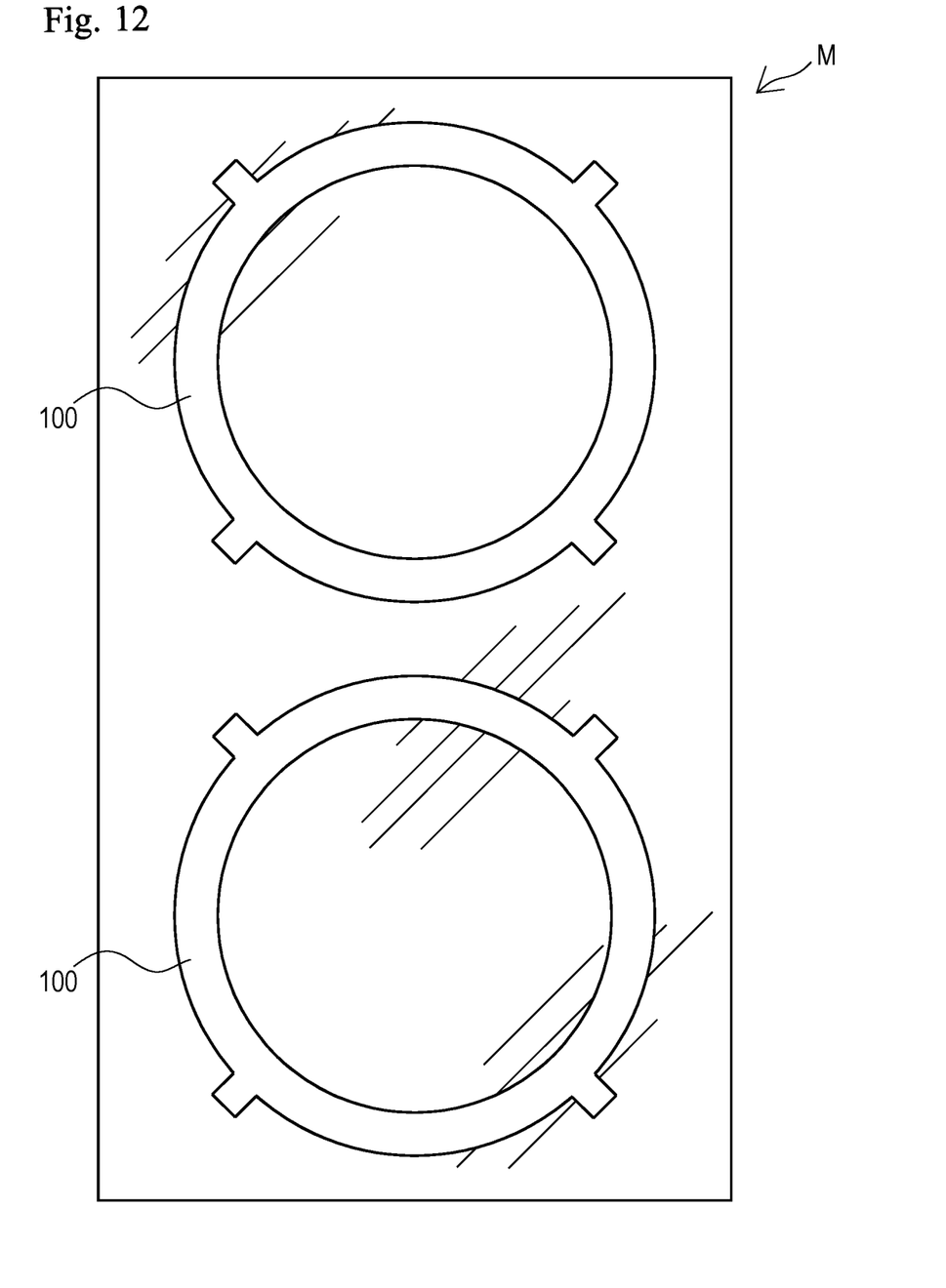
FIG. 12 is a schematic view showing a state in which a plurality of conventional washers have been taken out.

FIG. 12 shows a state in which a plurality of annular washers (was hers 100) are manufactured by punching a single plate-shaped material M with a mold. As shown in FIG. 12, a plurality of washers 100 can be manufactured by punching the material M many times while moving the material M in a certain direction with respect to the mold. However, since a relatively large space is present between the adjacent washers 100 and the inside the washer 100, the material for that portion (space) is wasted, and there has thus been room for improvement in poor material yield.

CITATION LIST

Patent Literature

Patent Literature 1: Japanese Patent Application Laid-Open No. 11-325108

SUMMARY OF INVENTION

Technical Problem

The present invention has been made in view of such circumstances as above, and in order to solve the problem, the present invention provides a washer and a washer manufacturing method capable of improving a material yield.

Solution to Problem

The problem to be solved by the present invention is as described above, and hereinafter, means for solving this problem will be described.

A washer of the present invention includes: a first member formed in a circular arc shape and formed with a first fitting portion that protrudes from one end in a circular arc direction; and a second member formed in a circular arc shape and formed with a second fitting portion that is recessed from one end in the circular arc direction and fitted with the first fitting portion. The first fitting portion and the second fitting portion are fitted in a state where approach and separation therebetween in the circular arc direction are controlled. One of the first fitting portion and the second fitting portion includes a fixing portion that is formed in a state where a side surface of the one of the fitting portions is pushed into a side surface of the other of the fitting portions, the one of the fitting portions being fixed to the other of the fitting portions by the fixing portion.

In the washer of the present invention, the first fitting portion includes a tip disposed from one end of the first member through a base end, and the fixing portion is formed over an entire side surface of the tip.

In the washer of the present invention, the tip of the first fitting portion is formed in a circular shape.

In the washer of the present invention, an oil reservoir that is recessed inward is formed in the tip of the first fitting portion.

A washer manufacturing method of the present invention includes: a preparation step of preparing a plate-shaped material; a taking out step of taking out, from the material, a first member formed in a circular arc shape and formed with a first fitting portion that protrudes from one end in an circular arc direction, and a second member formed in a circular arc shape and formed with a second fitting portion that is recessed from one end in the circular arc direction; a fitting step of fitting the first fitting portion of the first member and the second fitting portion of the second member; and a crimping step of pushing a side surface of one of the first fitting portion and the second fitting portion against a side surface of the other of the fitting portions to form a crimped portion.

In the washer manufacturing method of the present invention, the first fitting portion includes a tip disposed from one end of the first member through a base end, and in the crimping step, the crimped portion is formed over the entire side surface of the tip.

In the washer manufacturing method according to the present invention, in the crimping step, the tip of the first fitting portion is pressed to form an oil reservoir that is recessed inward together with the crimped portion.

Advantageous Effects of Invention

As the effects of the present invention, effects as described below are produced.

The washer of the present invention enables improvement in material yield.

The washer of the present invention enables firm fixing of the first member and the second member.

The washer of the present invention enables storage of lubricant.

The washer manufacturing method of the present invention enables improvement in material yield.

The washer manufacturing method of the present invention enables firm fixing of the first member and the second member.

The washer manufacturing method of the present invention enables storage of lubricant.

DESCRIPTION OF EMBODIMENTS

Hereinafter, a description will be given defining directions indicated by arrows U, D, F, B, L, and R respectively as upward, downward, forward, backward, leftward, and rightward.

The configuration of the washer 1 according to the first embodiment of the present invention will be described below with reference to FIGS. 1 to 3.

The washer 1 is a member for receiving an appropriate load. The washer 1 is formed in an annular shape in front view. The washer 1 is provided in an appropriate member (e.g., a housing or the like that supports a shaft member). The washer 1 can be subjected to a load (e.g., a load in the axial direction from the shaft member). The washer 1 is made up of a plurality (four in the present embodiment) of washer pieces 10. The four washer pieces 10 are connected to each other to form the washer 1 in the annular shape as a whole. In the present embodiment, the four washer pieces 10 are formed in the same shape.

Figure 1:
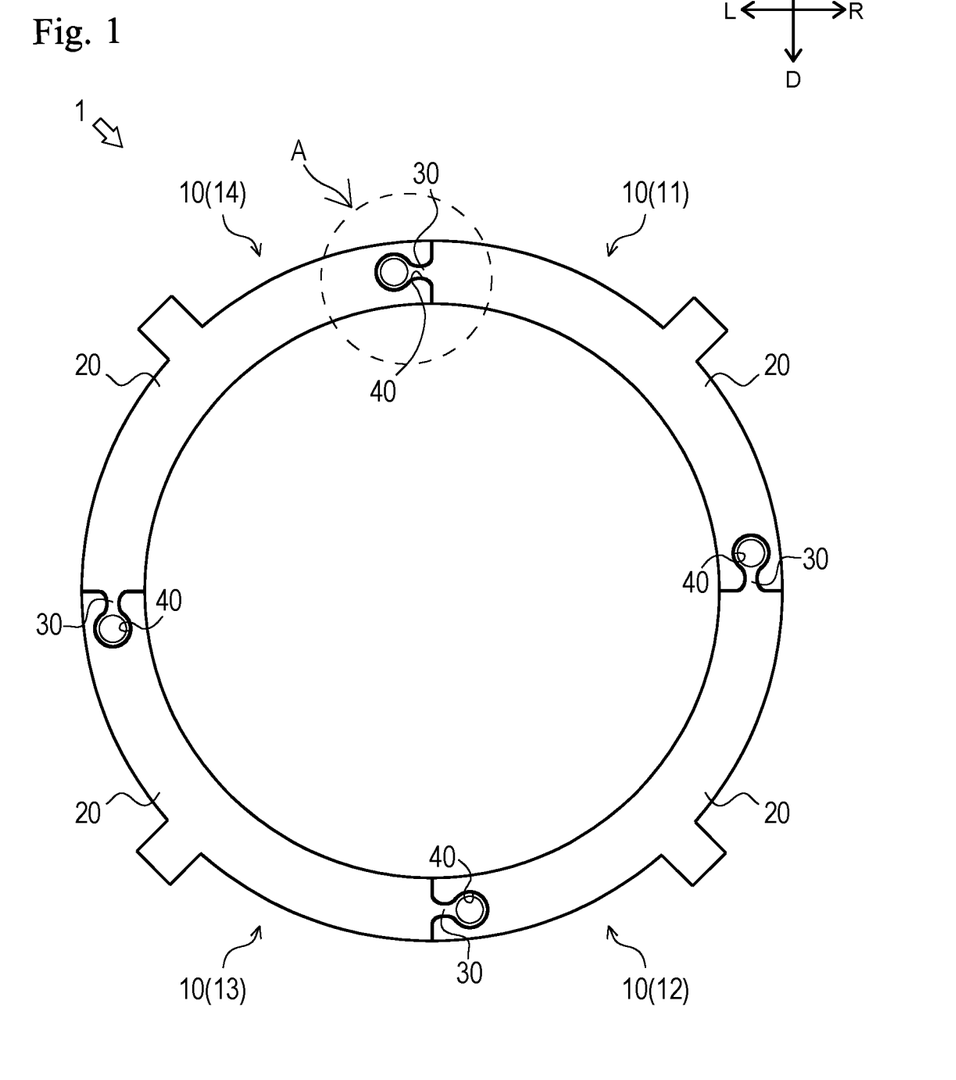
FIG. 1 is a front view showing a configuration of a washer according to a first embodiment of the present invention.

In the following, for convenience of description, a circumferential direction of the washer 1 is simply referred to as a "circumferential direction" (circular arc direction), and a radial direction of the washer 1 is simply referred to as a "radial direction." Further, among the four washer pieces 10, the washer piece 10 disposed in an upper right part in FIG. 1 is referred to as a "first washer piece 11", the washer piece 10 disposed in a lower right part is referred to as a "second washer piece 12", the washer piece 10 disposed in a lower left portion is referred to as a "third washer piece 13", and the washer piece 10 disposed in an upper left portion is referred to as a "fourth washer piece 14."

Since the washer pieces 10 are formed to have the same shape as described above, hereinafter, the first washer piece 11 will be mainly described in detail, and the detailed description of the other washer pieces 10 will be omitted as appropriate.

The first washer piece 11 is formed in a plate shape with its plate surface facing the front-rear direction. The first washer piece 11 is formed of an appropriate metal material (e.g., a bimetallic material or a ferrous material obtained by sintering on its surface a metal having high abrasion resistance or the like). The first washer piece 11 mainly includes a body portion 20, a first fitting portion 30, and a second fitting portion 40.

Figure 2:
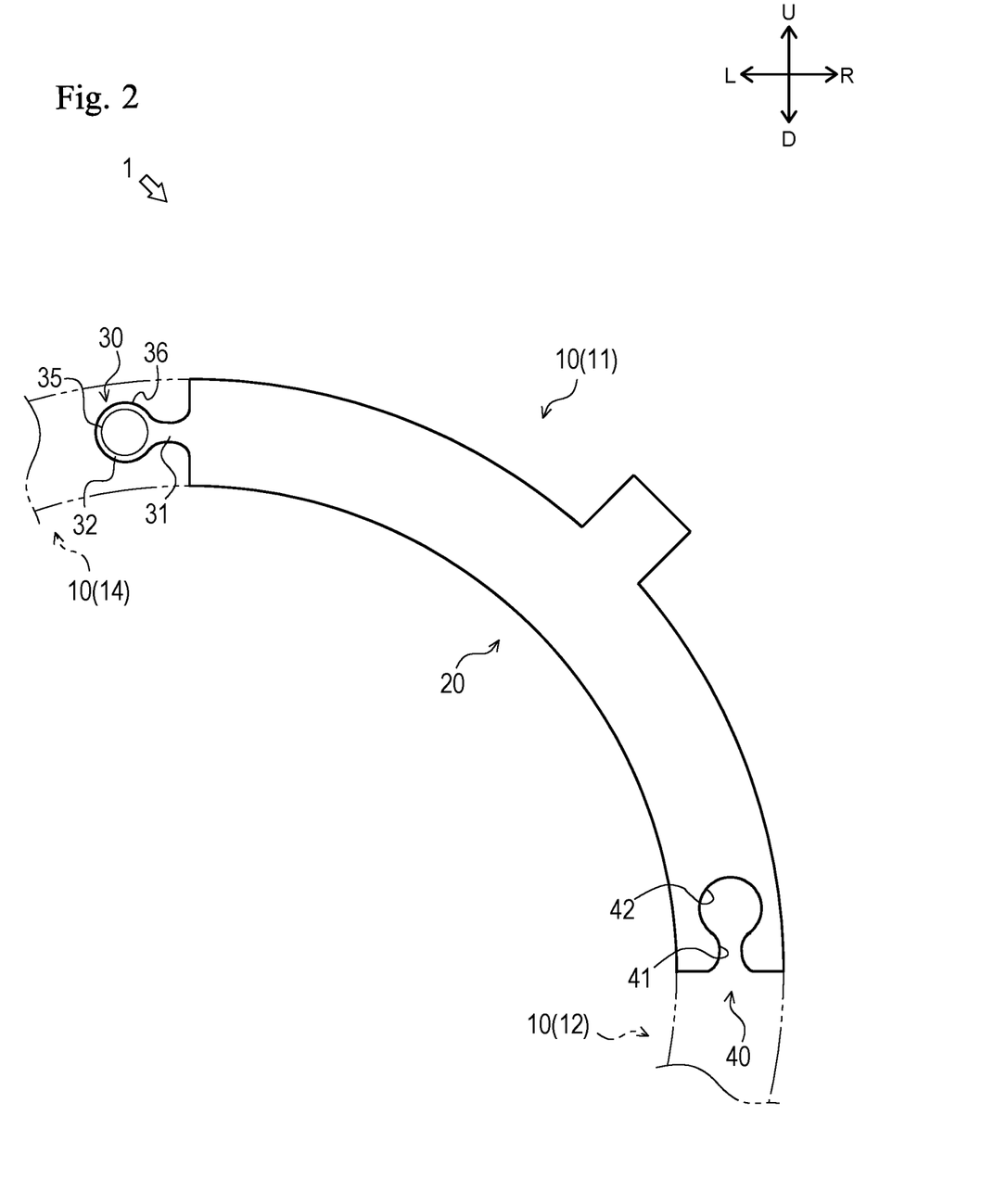
FIG. 2 is a front view showing a configuration of a washer piece.
Figure 3A:
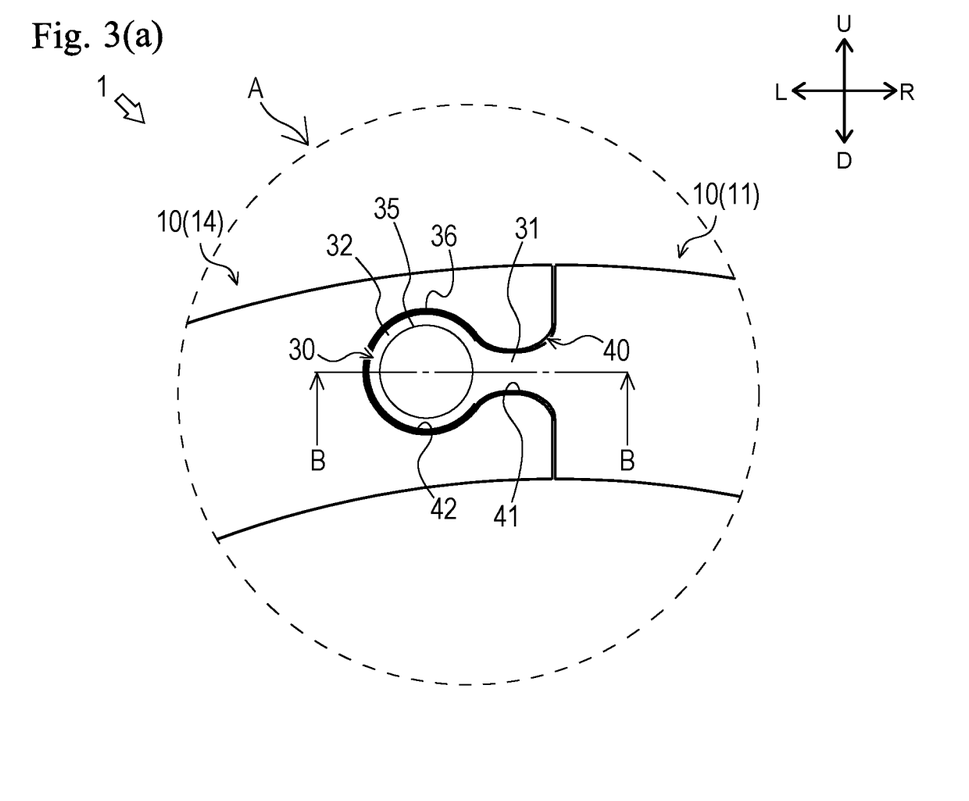
FIG. 3(a) is an enlarged view of a portion A in FIG. 1.
Figure 3B:
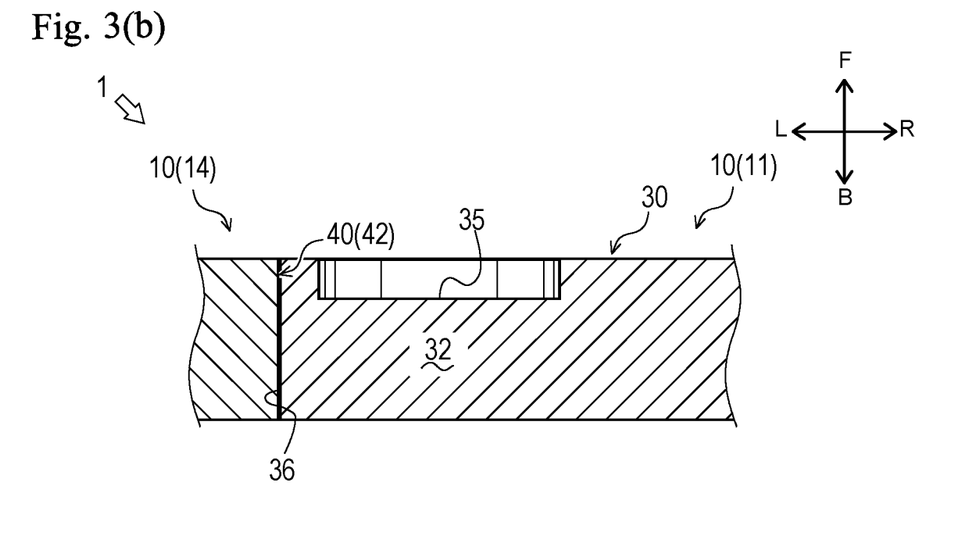
FIG. 3(b) is a cross-sectional view taken along line B-B.

The body portion 20 shown in FIGS. 1 to 3 is a portion that forms a main portion (a portion excluding both ends) of the first washer piece 11. The body portion 20 is formed in a circular arc shape having a central angle of about 90 degrees in front view. Hereinafter, the upper end in the circumferential direction of the body portion 20 is referred to as the "upper end", and the lower end in the circumferential direction is referred to as the "lower end".

The first fitting portion 30 shown in FIGS. 1 to 3 is a portion protruding in the circumferential direction (circular arc direction) from the upper end of the body portion 20. The first fitting portion 30 is fitted to the second fitting portion 40 of the fourth washer piece 14 adjacent to and circumferentially on the left of the first washer piece 11. The first fitting portion 30 is formed so as to extend circumferentially outward from the upper end of the body portion 20. The first fitting portion 30 mainly includes a first base end 31 and a first tip 32.

The first base end 31 shown in FIGS. 2 and 3 is a portion disposed on the body portion 20 side (right side) of the first fitting portion 30 formed so as to extend in the circumferential direction. The first base end 31 is formed in a substantially rectangular shape slightly rounded in front view. The first base end 31 is formed so as to protrude circumferentially outward from the radial center of the upper end of the body portion 20.

The first tip 32 shown in FIGS. 2 and 3 is a portion disposed on the fourth washer piece 14 side (left side) of the first fitting portion 30 formed so as to extend in the circumferential direction. The first tip 32 is formed in a substantially perfect circle shape in front view. The first tip 32 is disposed at a position separated circumferentially outward from the upper end of the body portion 20 through the first base end 31. The radially outer end of the first tip 32 is formed so as to be located outside the radially outer end of the first base end 31. In addition, the radially inner end of the first tip 32 is formed so as to be located inside the radially inner end of the first base end 31. In this way, the first tip 32 is formed to be radially wider than the first base end 31 as a whole.

With the first base end 31 and the first tip 32 constituted as thus described, the first fitting portion 30 is formed to have a rounded shape (a shape without a corner) as a whole in front view. That is, as will be described later, the first fitting portion 30 is formed in a shape that is easily taken out of the material M by press working.

An oil reservoir 35 and a crimped portion 36 are formed in the first tip 32.

The oil reservoir 35 shown in FIGS. 2 and 3 is a portion in which the front side surface of the first tip 32 is recessed rearward (thickness direction). The oil reservoir 35 can store the lubricant that is fed to the sliding surface (the front side surface of the washer 1) when the washer 1 slides with the shaft member. The oil reservoir 35 has substantially the same shape as the first tip 32 (perfect circle in front view), and is smaller than the first tip 32 by one size. In front view, the center point of the oil reservoir 35 is formed so as to overlap the center point of the first tip 32.

The crimped portion 36 shown in FIGS. 2 and 3 is a portion of the first tip 32, pushed into the side surface of the second fitting portion 40 of the fourth washer piece 14 (specifically, the side surface of the first tip 32). The first fitting portion 30 and the second fitting portion 40 (of the fourth washer piece 14) in a state fitted to each other are fixed by the crimped portion 36, and further, the first washer piece 11 and the fourth washer piece 14 are fixed.

Note that the configuration of the crimped portion 36 will be described later in detail.

The second fitting portion 40 shown in FIGS. 1 to 3 is a portion (notched portion) recessed from the lower end of the body portion 20 in the circumferential direction (circular arc direction). For convenience of description, FIG. 3 shows the second fitting portion 40 of the fourth washer piece 14 instead of the second fitting portion 40 of the first washer piece 11. The second fitting portion 40 has substantially the same external shape as the first fitting portion 30 in front view. The second fitting portion 40 is fitted with the first fitting portion 30 of the second washer piece 12 adjacent to and circumferentially underneath the first washer piece 11. The second fitting portion 40 is formed so as to extend circumferentially inward from the lower end of the body portion 20. The second fitting portion 40 mainly includes a second base end 41 and the second tip 42.

The second base end 41 shown in FIGS. 2 and 3 is a portion disposed on the second washer piece 12 side (lower side) of the second fitting portion 40 formed so as to extend in the circumferential direction. The second base end 41 is formed in a substantially rectangular shape slightly rounded in front view. The second base end 41 is formed so as to be recessed (notched) circumferentially inward from the radial center of the lower end of the body portion 20.

The second tip 42 shown in FIGS. 2 and 3 is a portion disposed on the body portion 20 side (upper side) of the second fitting portion 40 formed so as to extend in the circumferential direction. The second tip 42 is formed in a substantially perfect circular shape in front view. The second tip 42 is disposed at a position separated circumferentially inward from the lower end of the body portion 20 through the second base end 41. The radially outer end of the second tip 42 is formed so as to be located outside the radially outer end of the second base end 41. In addition, the radially inner end of the second tip 42 is formed so as to be located inside the radially inner end of the second base end 41. In this way, the second tip 42 is formed to be radially wider than the second base end 41 as a whole.

With the configuration as described above, the first fitting portion 30 and the second fitting portion 40 are formed in a jigsaw puzzle shape with each other. Specifically, as shown in FIG. 3(a), the first base end 31 of the first fitting portion 30 is disposed with almost no space inside the second base end 41 of the second fitting portion 40. The first tip 32 of the first fitting portion 30 is disposed with almost no space inside the second tip 42 of the second fitting portion 40. Hence the first fitting portion 30 and the second fitting portion 40 are fitted to each other in a meshing state. In other words, when the first fitting portion 30 is disposed inside the second fitting portion 40, the first fitting portion 30 and the second fitting portion 40 are fitted in a state where the circumferential approach and separation therebetween are controlled (even if there is no crimped portion 36).

In the above description, the first washer piece 11 of the four washer pieces 10 has been described, but the other three washer pieces 10 (the second washer piece 12, the third washer piece 13 and the fourth washer piece 14) are configured in the same manner. Each of the four washer pieces 10 is fixed to its circumferentially adjacent washer pieces 10 by the first fitting portion 30 and the second fitting portion 40, to constitute one washer.

A manufacturing method for the washer 1 configured as described above will be described below with reference to FIGS. 4 to 9.

Figure 4:
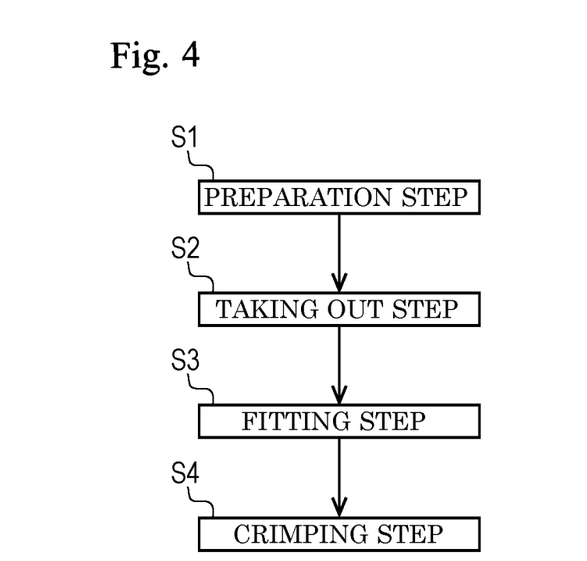
FIG. 4 is a flowchart showing a washer manufacturing method.

As shown in FIG. 4, the manufacturing method for the washer 1 mainly includes preparation step 1i, taking out step S2, fitting step S3, and crimping step S4.

Figure 5A:
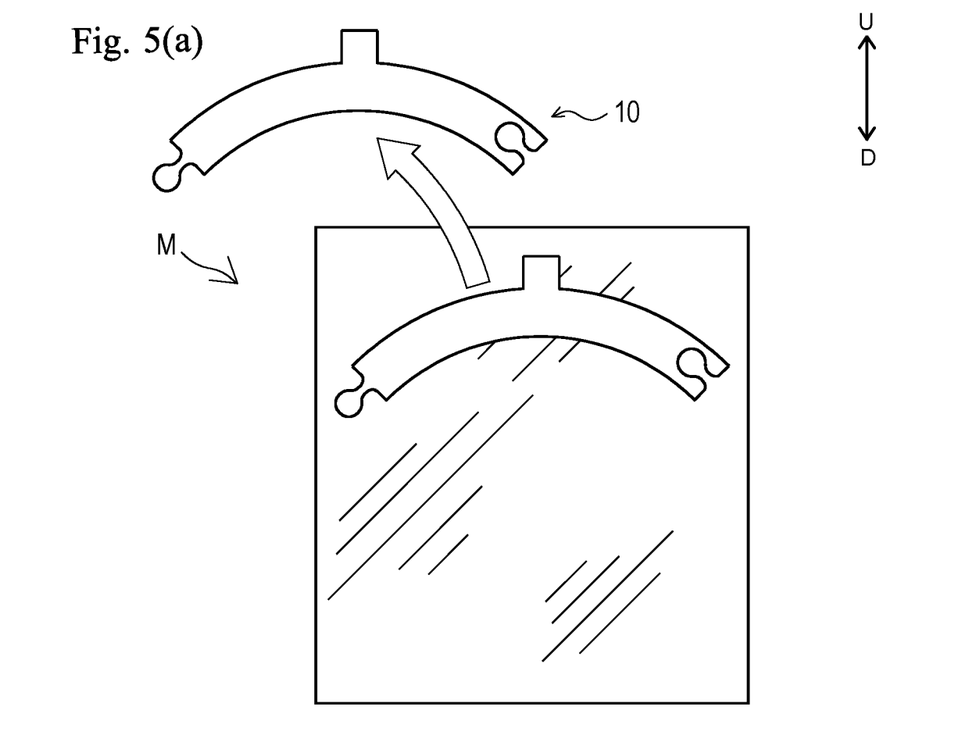
FIG. 5(a) is a front view showing a state in which a washer has been taken out in a taking out step.
Figure 5B:
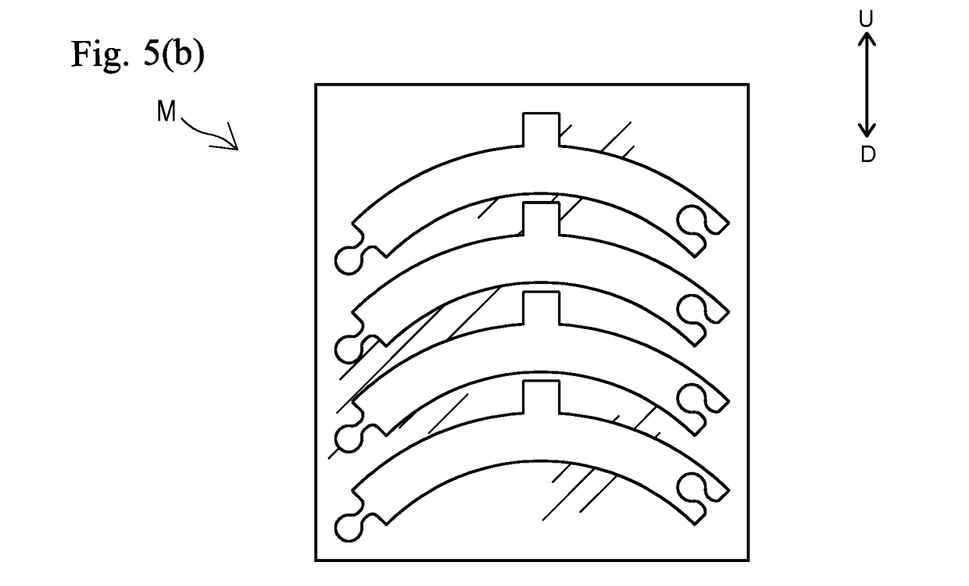
FIG. 5(b) is a schematic view showing a material from which a plurality of washers have been taken out.

Preparation step S1 is a step of preparing the material M. As shown in FIG. 5, the material M is a member in a rectangular plate shape. The material M is formed of an appropriate material (e.g., a steel plate formed of a single kind of material, a bimetal formed of plural kinds of materials, etc.). The material M is disposed with its longitudinal direction oriented in the vertical direction After preparation step S1 is performed, taking out step S2 is performed.

Taking out step S2 is a step of taking out the washer piece 10 from the material M prepared in preparation step S1. In taking out step S2, a portion of the material M corresponding to the shape of the washer piece 10 is removed (punched by press working) using a predetermined mold formed in the shape of the washer piece 10. As a result, as shown in FIG. 5(a), one washer piece 10 can be obtained from the material M. In taking out step S2, a plurality of washer pieces 10 are taken out along the longitudinal direction of the material M as shown in FIG. 5(b). As a result, a plurality of washer pieces 10 can be obtained from the material M.

After taking out step S2 is performed, fitting step S3 is performed.

Fitting step S3 is a step of fitting the plurality of washer pieces 10 taken out in taking out step S2. In the present embodiment, in order to form one washer 1, each of four washer pieces 10 is fitted as described above.

Specifically, the second fitting portion 40 of the washer piece 10, which is adjacent to one washer piece 10 in one circumferential direction (counterclockwise in front view), is fitted with the first fitting portion 30 of the one washer piece 10. Further, the first fitting portion 30 of the washer piece 10, which is adjacent to the one washer piece 10 in the other circumferential direction (clockwise in front view), is fitted to the second fitting portion 40 of the one washer piece 10. When each of the four washer pieces 10 is thus fitted, an annular member is formed.

Figure 6A:
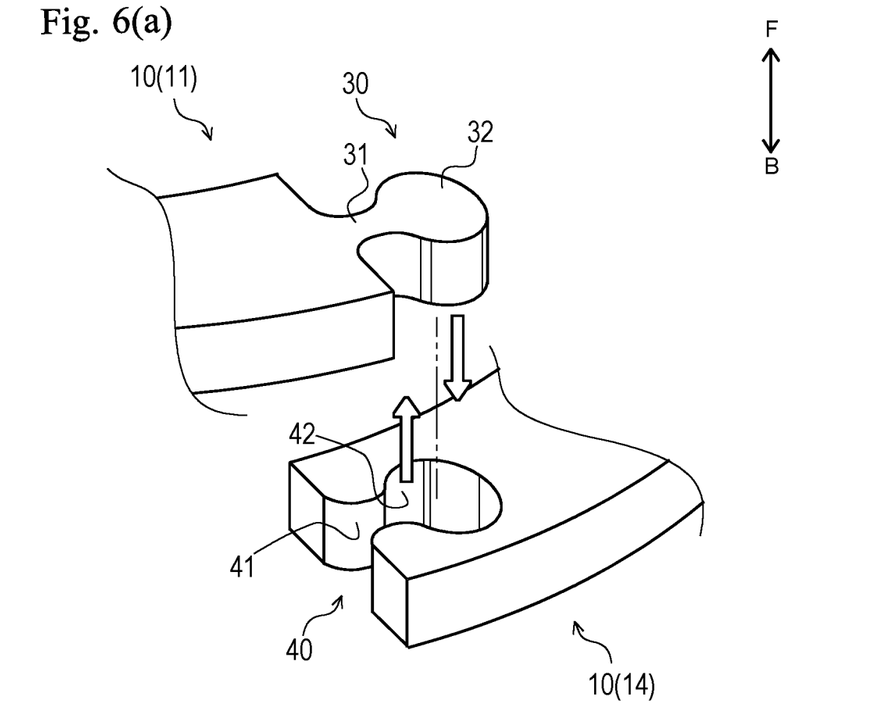
FIG. 6(a) is a perspective view showing how the first fitting portion and the second fitting portion are fitted in the fitting step.
Figure 6B:
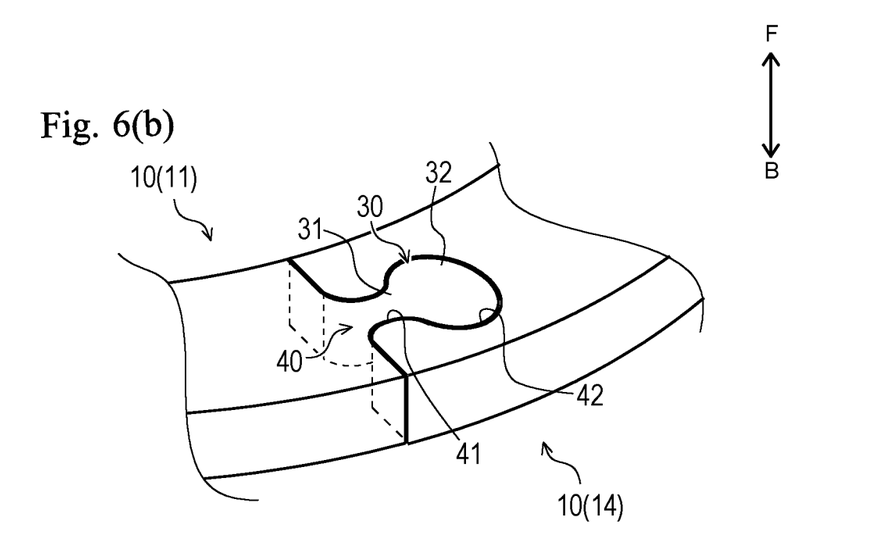
FIG. 6(b) is a perspective view showing a state in which the first fitting portion and the second fitting portion are fitted in the fitting step.

In the case of fitting the first fitting portion 30 and the second fitting portion 40 to each other, first, as shown in FIG. 6(a), the first fitting portion 30 and the second fitting portion 40 are arranged so as to face each other in the front-rear direction. Thereafter, as shown in FIGS. 6(a) and 6(b), the first fitting portion 30 and the second fitting portion 40 move closer to each other, and the first fitting portion 30 enters into the second fitting portion 40. In this way, the first fitting portion 30 and the second fitting portion 40 are fitted to each other.

After fitting step S3 is performed, crimping step S4 is performed.

Figure 7A:
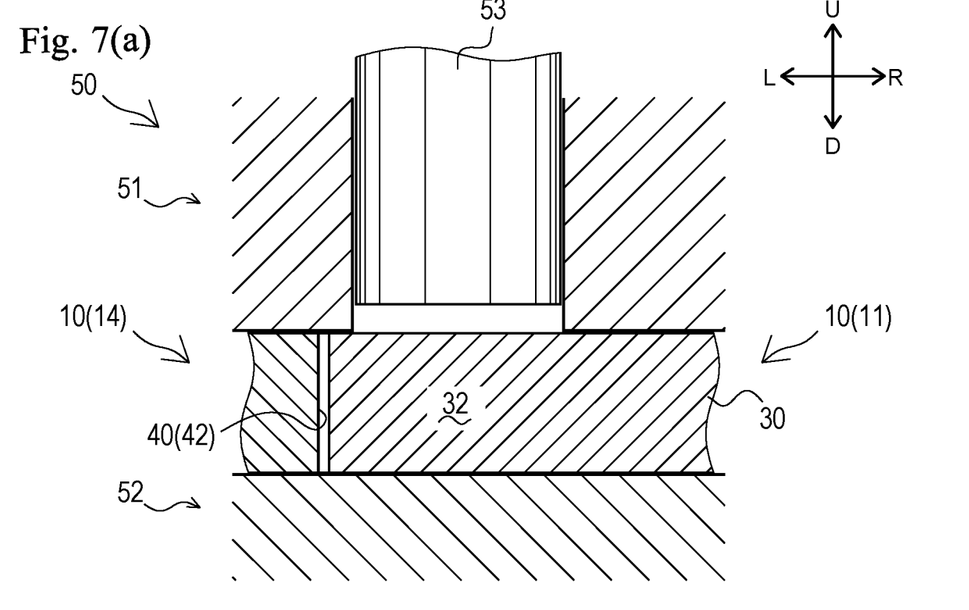
FIG. 7(a) is a schematic view showing how a crimped portion is formed in a crimping step.
Figure 7B:
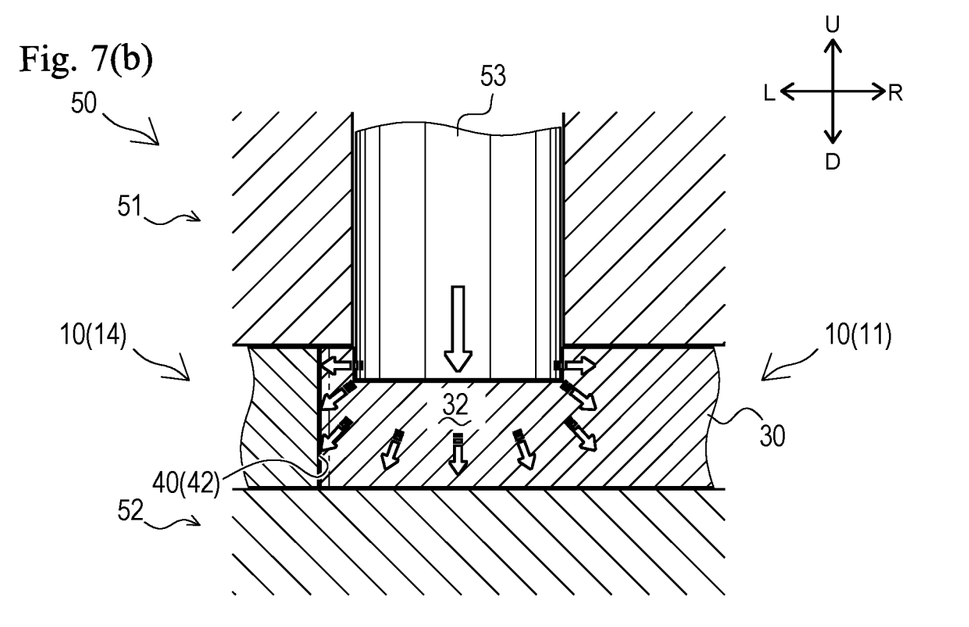
FIG. 7(b) is a view showing the continuation of FIG. 7(a).
Figure 8:
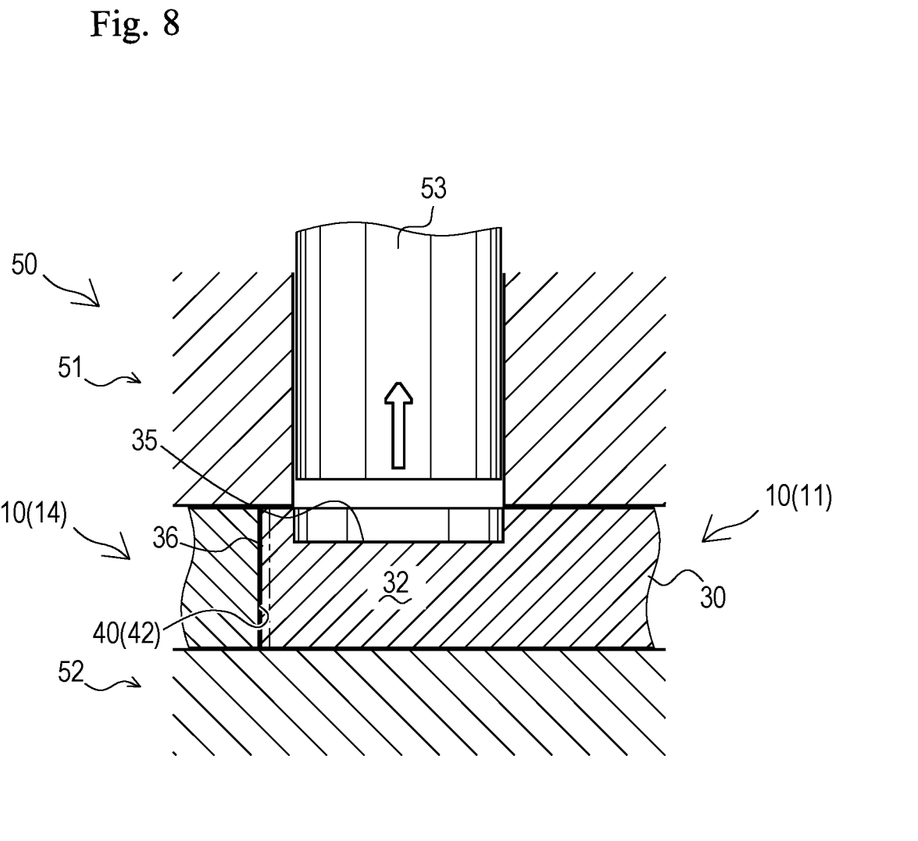
FIG. 8 is a view showing the continuation of FIG. 7(b).

Crimping step S4 is a step of forming the crimped portion 36 on the first fitting portion 30 (more specifically, the side surface of the first tip 32 of the first fitting portion 30). In crimping step S4, as shown in FIGS. 7 and 8, press working is performed using a crimping device 50. Note that FIGS. 7 and 8 are schematic views showing how the crimped portion 36 is formed in crimping step. In FIGS. 7 and 8, it is assumed that the washer piece 10 is disposed with its plate surfaces facing the vertical direction.

As shown in FIGS. 7 and 8, the crimping device 50 includes an upper mold 51 and a lower mold 52 which are a pair of molds. The washer piece 10 (the first fitting portion 30 and the second fitting portion 40 fitted to each other) is disposed between the upper mold 51 and the lower mold 52. The upper mold 51 is provided with a punch 53. The punch 53 is configured to be lifted and lowered, and presses the first tip 32 of the first fitting portion 30 from the upper side to the lower side. The punch 53 is formed in a substantially columnar shape with its axis direction oriented in the vertical direction. The lower side surface (pressing surface) of the punch 53 is substantially the same shape (perfect circle) as the first tip 32 of the first fitting portion 30, and is formed to be slightly smaller than the first tip 32 by one size.

In crimping step S4, first, as shown in FIG. 7(*a*), the first tip 32 of the first fitting portion 30 (in a state fitted to the second fitting portion 40) is disposed below the punch 53. The first tip 32 of the first fitting portion 30 is disposed such that the center point of the first tip 32 vertically overlaps the center point of the lower side surface of the punch 53. Next, as shown in FIG. 7(*b*), the punch 53 is lowered.

When the punch 53 is thus lowered, the lower side surface of the punch 53 comes into contact with the upper side surface of the first tip 32 and pushes the upper side surface downward.

Figure 9:
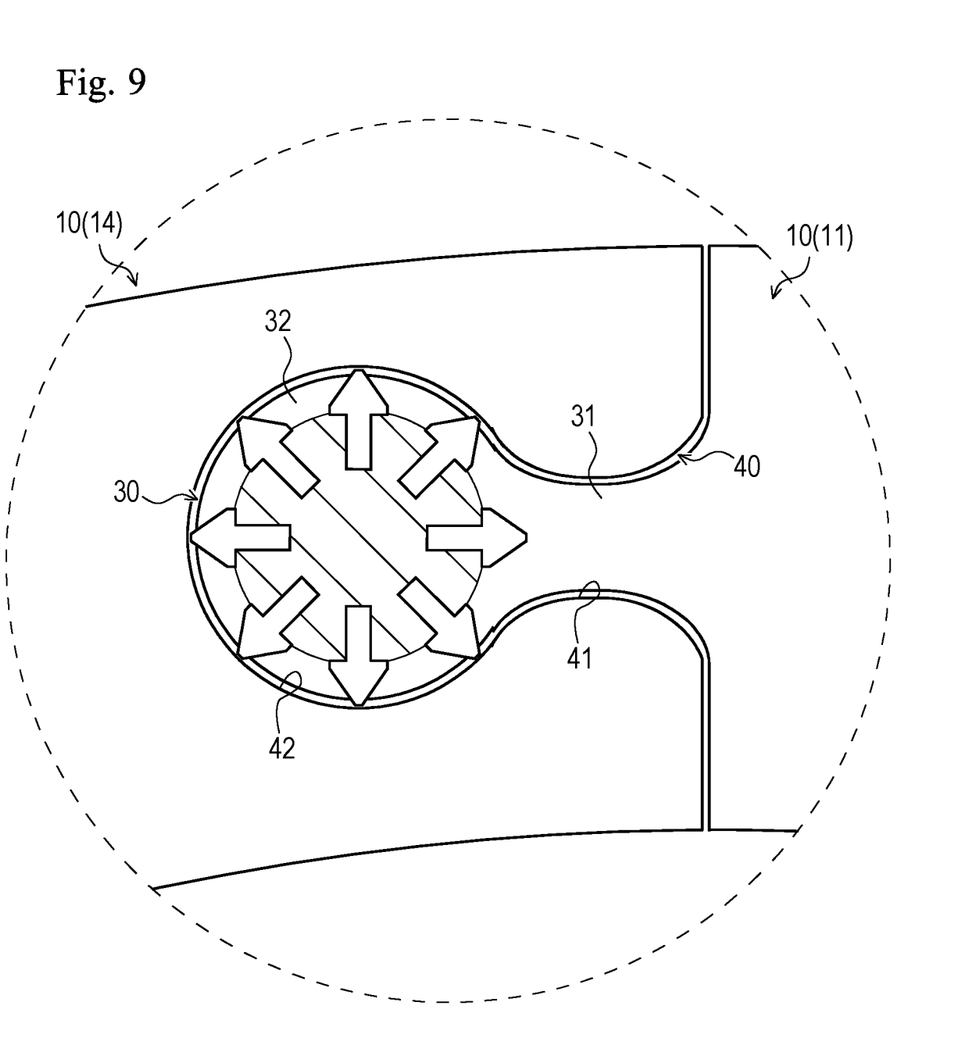
FIG. 9 is a schematic view showing a state in which a punch is pressed against a tip of a first fitting portion in the crimping step.

When the upper side surface of the first tip 32 is pushed in, as shown in FIGS. 7(*b*) and 9, the first tip 32 is pushed and spread outward by an amount corresponding to the pushing-in from the punch 53. When the first tip 32 is thus pushed and spread outward, the side surface of the first tip 32 is pushed into the side surface of the second tip 42, and the first tip 32 and the second tip 42 are fixed to each other. In this way, by pushing and spreading the first tip 32 with the punch 53, the crimped portion 36 is formed on the side surface of the first tip 32.

After the crimped portion 36 is formed (after the lowering of the punch 53 is completed), the punch 53 is lifted as shown in FIG. 8. When the punch 53 is lifted, a recess (i.e., the oil reservoir 35) being recessed downward is formed on the upper side surface of the first tip 32. In this way, in the crimping device 50, by performing one operation of lifting/lowering the punch 53, the crimped portion 36 and the oil reservoir 35 can be simultaneously formed in the first tip 32.

Hereinafter, the configuration (feature) of the crimped portion 36, formed by the method as described above, will be described in detail with reference to FIGS. 3 and 7 to 9.

As described above, due to formation of the crimped portion 36 on the side surface of the first tip 32, the crimped portion 36 is not protruding from the sliding surface of the washer 1 (the front side surface of the washer 1 shown in FIG. 1). Hence the washer 1 can smoothly slide the shaft member.

In crimping step S4, the crimped portion 36 is formed using the crimping device 50 as described above. In the crimping device 50, at the time when the punch 53 is pressed against the first tip 32, the washer piece 10 is disposed between the upper mold 51 and the lower mold 52. That is, even when the first tip 32 is pushed and spread to form the crimped portion 36, a portion of the first tip 32 is prevented from projecting upward from the upper side surface of the first tip 32 shown in FIGS. 7 and 8 and from projecting downward from the lower side surface of the first tip 32. As thus described, when the crimped portion 36 is formed, after crimping step S4 is completed, it is possible to omit the troubles such as polishing of the sliding surface of the washer 1 as much as possible.

Note that FIG. 9 is a schematic view showing how the punch 53 is pressed against the first tip 32 in crimping step S4. In FIG. 9, a portion hatched in the first tip 32 indicates the lower side surface of the punch 53, namely, the portion in contact with the upper side surface of the first tip 32 in the punch 53. Here, as described above, the lower side surface (pressing surface) of the punch 53 has substantially the same shape (perfect circle) as the first tip 32 of the first fitting portion 30, and the lower side surface is formed to be smaller by one size than the first tip 32

At the time when the punch 53 presses the first tip 32, the first tip 32 is disposed such that the center point of the first tip 32 vertically overlaps the center point of the lower side surface of the punch 53.

With such a configuration, when the punch 53 is pressed against the first tip 32, as shown in FIG. 9, the first tip 32 is pushed and spread evenly (in a balanced manner) in four directions toward the second tip 42. Hence, the first tip 32 is pushed into the second tip 42 in a balanced manner in four directions to form the crimped portion 36 in the first tip 32, so that it is possible to firmly fix the first tip 32 and the second tip 42 (further, the first fitting portion 30 and the second fitting portion 40).

In addition, since the radial center of the upper end of the body portion 20 is recessed circumferentially inward, the body portion 20 is relatively easily spread radially outward and inward. However, in the present embodiment, as described above, the second tip 42 is disposed at a position separated circumferentially inward from the lower end of the body portion 20 through the second base end 41. With such a configuration, when the punch 53 is pressed against the first tip 32 fitted to the second tip 42, it is possible to prevent the upper end of the body portion 20 from spreading radially outward and inward.

In addition, when the punch 53 is pressed against the first tip 32, as shown in FIG. 9, the first tip 32 is pushed and spread evenly (in a balanced manner) in four directions toward the second tip 42, whereby the crimped portion 36 is formed over the entire side surface of the first tip 32 (cf. FIG. 3(*a*) etc.). In this way, the crimped portion 36 is formed so as to have a cylindrical shape covering the entire side surface of the first tip 32.

Hence in the first tip 32, for example, as compared to a case where the crimped portion 36 is formed only on a part of the side surface of the first tip 32, it is possible to firmly fix the first tip 32 and the second tip 42 (further, the first fitting portion 30 and the second fitting portion 40).

As described above, the washer 1 according to the first embodiment of the present invention includes: a first washer piece 11 (first member) formed in a circular arc shape and formed with a first fitting portion 30 (first fitting portion) that protrudes from one end in an circular arc direction; and a fourth washer piece 14 (second member) formed in a circular arc shape and formed with a second fitting portion 40 (second fitting portion) that is recessed from one end in the circular arc direction and fitted with the first fitting portion 30 (first fitting portion). The first fitting portion 30 (first fitting portion) and the second fitting portion 40 (second fitting portion) are fitted in a state where approach and separation therebetween in the circular arc direction are controlled. One of the first fitting portion 30 (first fitting portion) and the second fitting portion 40 (second fitting portion) includes a crimped portion 36 (fixing portion) that is formed in a state where a side surface of the one of the fitting portions is pushed into a side surface of the other of the fitting portions, the one of the fitting portions being fixed to the other of the fitting portions by the crimped portion 36 (fixing portion).

With such a configuration, it is possible to obtain a plurality of washer pieces 10 from the material M by making the space between the adjacent washer pieces 10 relatively small. Then, one washer 1 can be obtained by fitting the first fitting portion 30 and the second fitting portion 40 in the plurality of washer pieces 10 and fixing the washer pieces 10 by the crimped portion 36. In this way, the number of the washers 1 obtained from the material M can be increased, and the material yield can be improved.

Since the crimped portion 36 is formed on the side surface of the first tip 32, the crimped portion 36 is not protruding from the sliding surface of the washer 1 (the front side surface of the washer 1 shown in FIG. 1). Hence the washer 1 can smoothly slide the shaft member.

In the washer 1, the first fitting portion 30 (first fitting portion) includes a first tip 32 disposed from one end of the first washer piece 11 (first member) through a first base end 31, and the crimped portion 36 is formed over an entire side surface of the first tip 32.

In the washer 1, the first tip 32 of the first fitting portion 30 (first fitting portion) is formed in a circular shape.

With such a configuration, it is possible to firmly fix the first fitting portion 30 and the second fitting portion 40, and it is further possible to firmly fix the plurality of washer pieces 10 (e.g., the first washer piece 11 and the fourth washer piece 14).

In the washer 1, an oil reservoir 35 that is recessed inward is formed in the first tip 32 of the first fitting portion 30 (first fitting portion)

With such a configuration, it is possible to store the lubricant that is fed to the sliding surface (the front side surface of the washer 1) when the washer 1 slides with the shaft member.

Further, as described above, the manufacturing method for the washer 1 according to the embodiment of the present invention includes: preparation step S1 of preparing a plate-shaped material M; a taking out step S2 of taking out, from the material M, a first washer piece 11 (first member) formed in a circular arc shape and formed with a first fitting portion 30 (first fitting portion) that protrudes from one end in an circular arc direction, and a fourth washer piece 14 (second member) formed in a circular arc shape and formed with a second fitting portion 40 (second fitting portion) that is recessed from one end in the circular arc direction; a fitting step S3 of fitting the first fitting portion 30 (first fitting portion) of the first washer piece 11 (first member) and the second fitting portion 40 (second fitting portion) of the fourth washer piece 14 (second member); and crimping step S4 of pushing a side surface of one of the first fitting portion 30 (first fitting portion) and the second fitting portion 40 (second fitting portion) against a side surface of the other of the fitting portions to form a crimped portion 36.

With such a configuration, it is possible to obtain a plurality of washer pieces 10 from the material M by making the space between the adjacent washer pieces 10 relatively small. Then, one washer 1 can be obtained by fitting the first fitting portion 30 and the second fitting portion 40 in the plurality of washer pieces 10 and fixing the washer pieces 10 by the crimped portion 36. In this way, the number of the washers 1 obtained from the material M can be increased, and the material yield can be improved.

Further, in the manufacturing method for the washer 1, the first fitting portion 30 (first fitting portion) includes a first tip 32 disposed from one end of the first washer piece 11 (first member) through a first base end 31, and in crimping step S4, the crimped portion 36 is formed at the first tip 32 of the first fitting portion 30 (first fitting portion).

With such a configuration, it is possible to firmly fix the first fitting portion 30 and the second fitting portion 40, and it is further possible to firmly fix the plurality of washer pieces 10 (e.g., the first washer piece 11 and the fourth washer piece 14).

In the manufacturing method for the washer 1, in crimping step S4, the first tip 32 of the first fitting portion 30 (first fitting portion) is pressed to form the oil reservoir 35 that is recessed inward together with the crimped portion 36.

With such a configuration, it is possible to store the lubricant that is fed to the sliding surface (the front side surface of the washer 1) when the washer 1 slides with the shaft member.

Further, by performing one operation of lifting/lowering the punch 53, it is possible to simultaneously form the crimped portion 36 and the oil reservoir 35 in the first tip 32, thus facilitating formation of the crimped portion 36 and the oil reservoir 35.

Note that the first washer piece 11 is an embodiment of the first member.

The fourth washer piece 14 is an embodiment of the second member. The crimped portion 36 is an embodiment of the fixing portion.

The embodiment of the present invention has been described above, but the present invention is not limited to the above configuration, and various modifications are possible within the scope of the invention described in the claims.

For example, the washer 1 is not limited to the application (thrust washer) receiving the load in the thrust direction, but it can be used for any purpose.

The washer 1 is not limited to the annular shape, but may be formed in a semicircular shape (a circular arc shape having a central angle of 180 degrees) or another circular arc shape (e.g., a circular arc shape having a central angle of 90 degrees, a circular arc shape having a central angle of 60 degrees, etc.).

Further, the washer piece 10 is not limited to the circular arc shape having a central angle of 90 degrees, but may be formed in a semicircular shape (a circular arc shape having a central angle of 180 degrees) or another circular arc shape (e.g., a circular arc shape having a central angle of 60 degrees, etc.).

The crimped portion 36 is not limited to the one formed on the side surface of the first tip 32 of the first fitting portion 30, but may be the one formed on the side surface of the second tip 42 of the second fitting portion 40. Alternatively, the crimped portion 36 may be formed on each of the side surface of the first tip 32 of the first fitting portion 30 and the side surface of the second tip 42 of the second fitting portion 40.

In the present embodiment, the crimped portion 36 is formed by pushing and spreading the first tip 32 with the punch 53, but the present invention is not limited thereto. That is, the crimped portion 36 can be formed by employing various methods capable of forming the side surface of the first fitting portion 30 in a state pushed into the side surface of the second fitting portion 40.

In addition, the method of taking out the washer piece 10 from the material M is not limited to the press working, but may be a method using a laser cutting device, for example. By using the laser cutting device as thus described, the flexibility in designing the shapes of the first fitting portion 30 and the second fitting portion 40 can be improved.

Hereinafter, a configuration of a washer according to each of other embodiments will be described with reference to FIGS. 10 and 11.

Figure 10A:
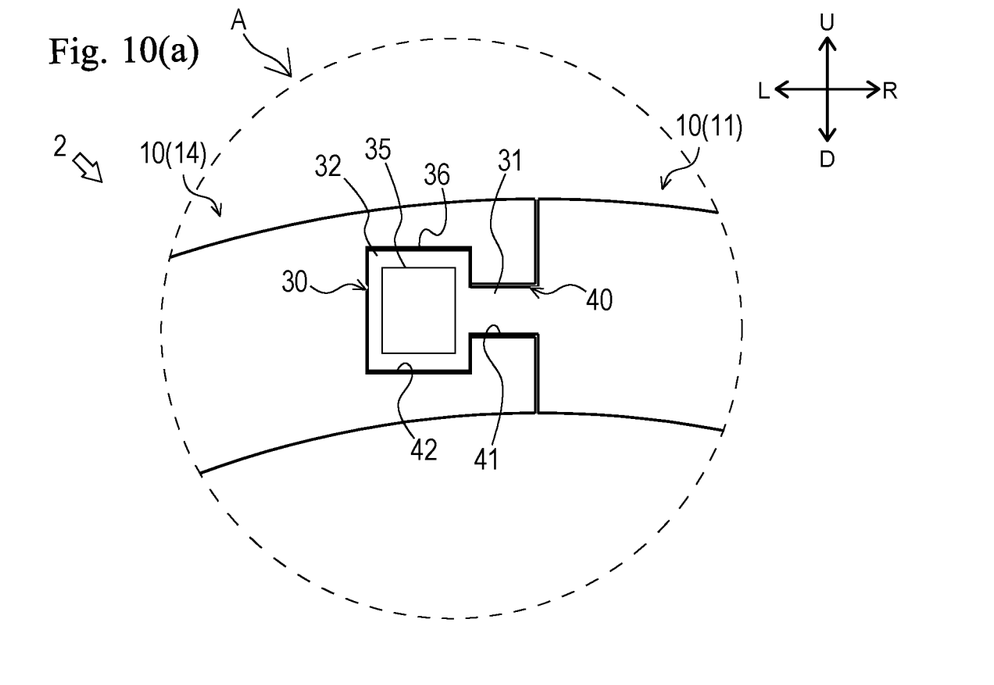
FIG. 10(a) is a front view showing a part of a configuration of a washer according to a second embodiment.

FIG. 10(a) is a front view showing a part of a configuration of a washer 2 according to a second embodiment. As shown in FIG. 10(a), in the washer 2, the first base end 31 of the first fitting portion 30 is formed in a substantially rectangular shape and the first tip 32 is formed in a substantially quadrangular shape. Further, the second base end 41 of the second fitting portion 40 is formed in a substantially rectangular shape, and the second tip 42 is formed in a substantially quadrangular shape. As thus described, the first fitting portion and the second fitting portion are not limited to rounded shapes, and may have shapes with corners.

Figure 10B:
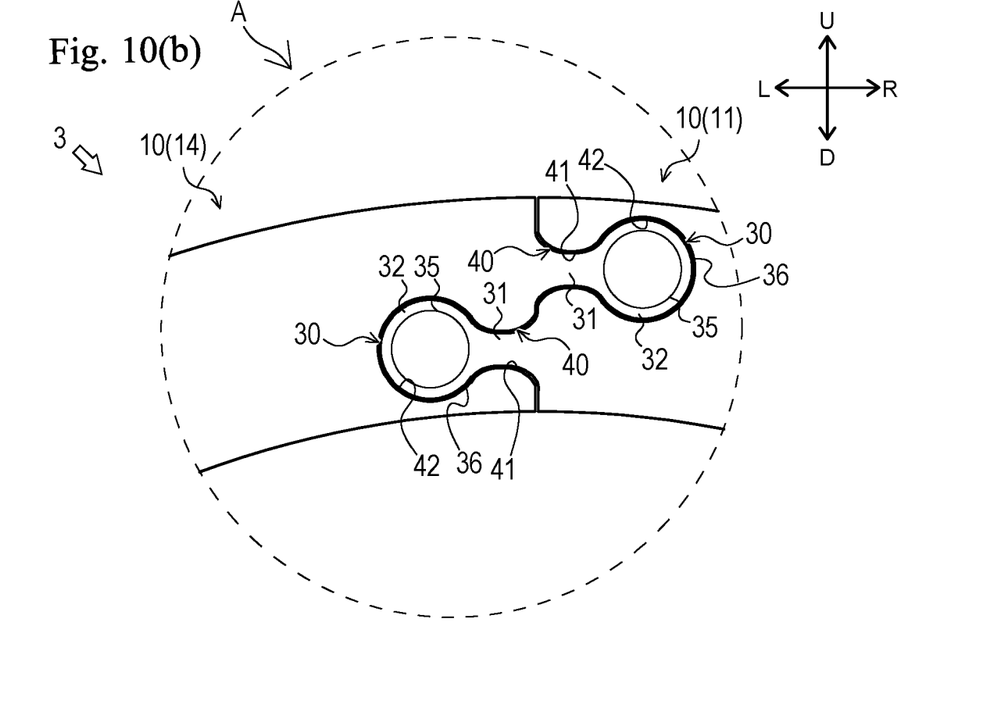
FIG. 10(b) is a front view showing a part of a configuration of a washer according to a third embodiment.

FIG. 10(b) is a front view showing a part of a configuration of a washer 3 according to a third embodiment. As shown in FIG. 10(b), in the washer 3, both the first fitting portion 30 and the second fitting portion 40 are formed at the respective ends of the washer piece 10. With such a configuration, it is possible to more strongly fix the plurality of washer pieces 10 to each other.

Figure 11:
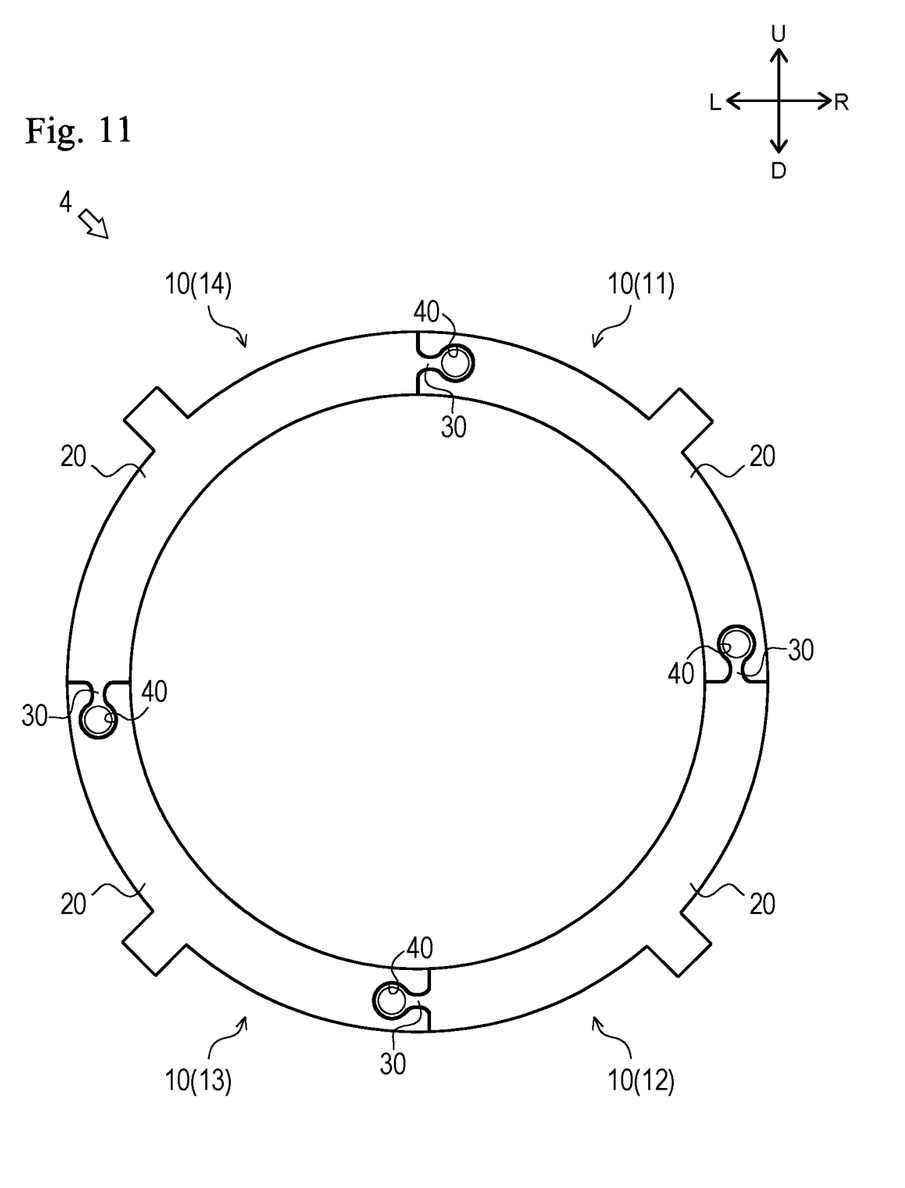
FIG. 11 is a front view showing a part of a configuration of a washer according to a fourth embodiment.

FIG. 11 is a front view showing a configuration of a washer 4 according to a fourth embodiment.

As shown in FIG. 11, in the washer 4, the second fitting portion 40 is formed only in the first washer piece 11 and the third washer piece 13 among the four washer pieces 10. Further, the first fitting portion 30 is formed only in the second washer piece 12 and the fourth washer piece 14 among the four washer pieces 10. As thus described, in the washer 4, it is possible to form the one washer using two types of washer pieces 10.

INDUSTRIAL APPLICABILITY

The present invention can be applied to a washer and a washer manufacturing method.

REFERENCE SIGNS LIST

1: Washer
10: Washer piece
11: First washer piece
12: Second washer piece
13: Third washer piece
14: Fourth washer piece
30: First fitting portion
31: First base end
32: First tip
36: Crimped portion
40: Second fitting portion
41: Second base end
42: Second tip

The invention claimed is:

1. A washer comprising:
a first member formed in a circular arc shape and formed with a first fitting portion that protrudes from one end in a circular arc direction; and
a second member formed in a circular arc shape and formed with a second fitting portion that is recessed from one end in the circular arc direction and fitted with the first fitting portion,
wherein
the first fitting portion and the second fitting portion are fitted in a state where approach and separation in the circular arc direction between the first fitting portion and the second fitting portion are controlled,
one of the first fitting portion and the second fitting portion includes a fixing portion that is formed in a state where a side surface of the one of the fitting portions is pushed into a side surface of the other of the fitting portions, the one of the fitting portions being fixed to the other of the fitting portions by the fixing portion,
the first fitting portion includes a tip disposed from one end of the first member through a base end,
the fixing portion is formed in the tip, and
an oil reservoir that is recessed inward is formed in the tip of the first fitting portion.

2. The washer according to claim 1, wherein
the fixing portion is formed over an entire side surface of the tip.

3. The washer according to claim 2, wherein the tip of the first fitting portion is formed in a circular shape.

4. A washer manufacturing method:
a preparation step of preparing a plate-shaped material;
a taking out step of taking out, from the material, a first member formed in a circular arc shape and formed with a first fitting portion that protrudes from one end in a circular arc direction, and a second member formed in a circular arc shape and formed with a second fitting portion that is recessed from one end in the circular arc direction;
a fitting step of fitting the first fitting portion of the first member and the second fitting portion of the second member; and
a crimping step of pushing a side surface of one of the first fitting portion and the second fitting portion against a side surface of the other of the fitting portions to form a crimped portion;
wherein:
the first fitting portion includes a tip disposed from one end of the first member through a base end, and
in the crimping step, the tip of the first fitting portion is pressed to form an oil reservoir that is recessed inward together with the crimped portion.

5. The washer manufacturing method according to claim 4, wherein in the crimping step, the crimped portion is formed over an entire side surface of the tip.

* * * * *